(12) United States Patent
Rhee et al.

(10) Patent No.: US 12,130,185 B2
(45) Date of Patent: Oct. 29, 2024

(54) BOLOMETER PIXEL-BASED THERMALLY ACTUATED TRIGGER ROIC WITH SELF-HEATING COMPENSATION AND CALIBRATION (BARRIER-SHC)

(71) Applicant: RAYTHEON COMPANY, Waltham, MA (US)

(72) Inventors: Jehyuk Rhee, Newbury Park, CA (US); Henry Lee, Goleta, CA (US); Matthew C. Thomas, Carpinteria, CA (US)

(73) Assignee: RAYTHEON COMPANY, Waltham, MA (US)

( * ) Notice: Subject to any disclaimer, the term of this patent is extended or adjusted under 35 U.S.C. 154(b) by 633 days.

(21) Appl. No.: 17/406,432

(22) Filed: Aug. 19, 2021

(65) Prior Publication Data

US 2023/0056910 A1    Feb. 23, 2023

(51) Int. Cl.
  *G01J 5/24*   (2006.01)
  *G01J 5/00*   (2022.01)
  *G01J 5/20*   (2006.01)

(52) U.S. Cl.
  CPC ......... *G01J 5/24* (2013.01); *G01J 2005/0077* (2013.01); *G01J 2005/202* (2013.01)

(58) Field of Classification Search
  CPC ............... G01J 15/24; G01J 2005/0077; G01J 2005/202
  See application file for complete search history.

(56) References Cited

U.S. PATENT DOCUMENTS

| | | | |
|---|---|---|---|
| 5,420,419 A | * | 5/1995 | Wood .................. H04N 5/33 250/370.15 |
| 10,868,979 B1 | | 12/2020 | Boesch et al. |
| 10,983,008 B2 | | 4/2021 | Mitchell et al. |
| 2020/0393304 A1 | | 12/2020 | Thomas et al. |

OTHER PUBLICATIONS

Perenzoni et al., "A 160×120-pixel Uncooled IR-FPA Readout Integrated Circuit with On-chip Non-uniformity Compensation" 2010 Proceedings of ESSCIRC. IEEE, Sep. 2010.*
International Search Report and Written Opinion issued in International Application No. PCT/US2022/033922; Application Filing Date Jun. 17, 2022; Date of Mailing Oct. 28, 2022 (14 pages).

* cited by examiner

*Primary Examiner* — Randy W Gibson
(74) *Attorney, Agent, or Firm* — CANTOR COLBURN LLP

(57) ABSTRACT

A trigger sense circuit includes a pseudo-differential comparator circuit in signal communication with a pixel array. The pseudo-differential comparator circuit includes a first input in signal communication with a reference pixel group included in the pixel array to receive a pixel reference voltage, and a second input in signal communication with a target pixel group included in the pixel array to receive a pixel target voltage. The pseudo-differential comparator circuit is configured to selectively operate in a calibration mode to remove false trigger events and a comparison mode to detect at least one overheated pixel included in the target pixel group.

20 Claims, 5 Drawing Sheets

BOLOMETER PIXEL-BASED THERMALLY ACTUATED TRIGGER ROIC WITH SELF-HEATING COMPENSATION AND CALIBRATION (BARRIER-SHC)

GOVERNMENT LICENSE RIGHTS

This disclosure was made with Government support under W15P7T-19-D-0082 awarded by the Department of Defense (DoD). The Government has certain rights in the disclosure.

BACKGROUND

The present teachings are generally related to thermal imaging systems, and more particularly, to a readout integrated circuit included in a thermal imaging system.

Bolometer pixels are used in a wide variety of infrared or thermal imaging applications. When they are exposed to heat sources, bolometer pixels change their resistance to provide an output signal. A readout integrated circuit (ROIC) is typically utilized to detect and measure the output signal from one or more of bolometer pixels included in a pixel array. However, bolometer pixels are vulnerable to excessive heat sources which can fundamentally change the mechanical properties and response of the pixels and degrade their resulting imaging capability. In addition, extreme heat sources can completely destroy the pixels.

SUMMARY

According to a non-limiting embodiment, a trigger sense circuit includes a pseudo-differential comparator circuit in signal communication with a pixel array. The pseudo-differential comparator circuit includes a first input in signal communication with a reference pixel group included in the pixel array to receive a pixel reference voltage, and a second input in signal communication with a target pixel group included in the pixel array to receive a pixel target voltage. The pseudo-differential comparator circuit is configured to selectively operate in a calibration mode to remove false trigger events and a comparison mode to detect at least one overheated pixel included in the target pixel group.

According to another non-limiting embodiment, a trigger sense circuit comprises a full-differential comparator circuit in signal communication with a pixel array. The full-differential comparator circuit comprises a first differential comparator and a second differential comparator. The first differential comparator is configured to compare a first pixel voltage associated with a first pixel group included in the pixel array with a first pixel voltage threshold defined by a second pixel group included in the pixel array. The second differential comparator is configured to compare a second pixel voltage associated with the second pixel group with a second pixel voltage threshold defined by the first pixel group. The full-differential comparator circuit is configured to selectively operate in a calibration mode to remove false trigger events, and a comparison mode to detect at least one overheated pixel included in one or both of the first pixel group and the second pixel group.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
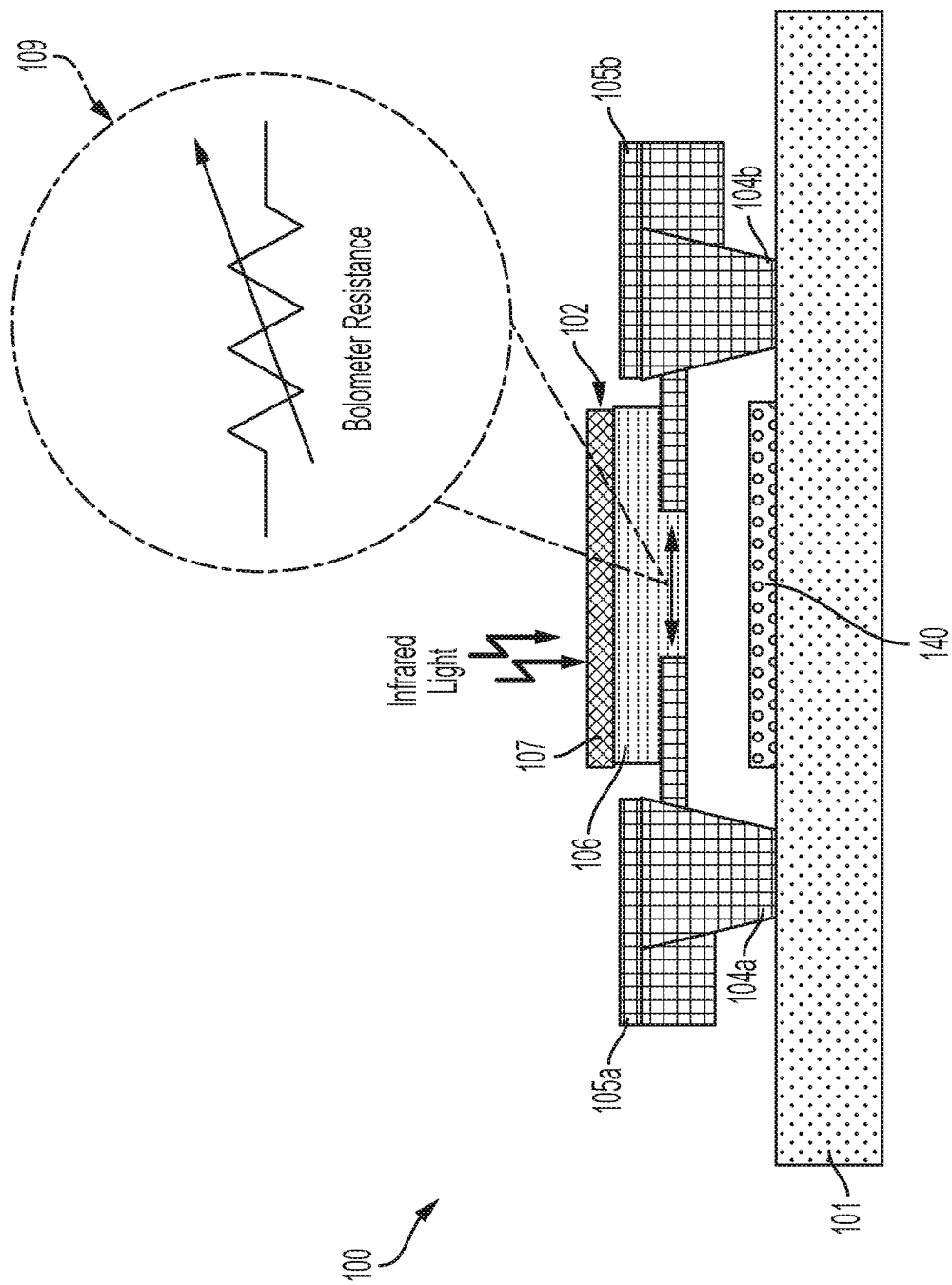
FIG. 1 is a block diagram view of a bolometer pixel according to a non-limiting embodiment.

Various non-limiting embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are more specifically relevant to aspects of the invention, readout integrated circuits (ROICs) are typically implemented in thermal imaging system to measure the resistivity of one or more bolometer pixels included in a pixel array. Conventional bolometer ROICs typically perform a measurement on a "biased" group of bolometer pixels included in the array for a small portion of a frame period while disregarding the "unbiased" bolometer pixels included in the array for the majority of a frame period. As a result, the ROIC may not identify an overheated bolometer pixel until a pixel group containing the over-heated bolometer pixel is biased and read out, which may take a considerable fraction of a frame period, ultimately resulting in irreversible damage to the over-heated bolometer pixel.

A solution for addressing the shortcomings described above is to provide a trigger sense circuit to the ROIC that weakly biases pixels when they are not being integrated and monitors the total parallel resistance to detect laser radiation, i.e., laser heating associated with the laser radiation. However, heat resulting from biasing the pixels during integration produces a self-heating effect that can mask the laser heating making it difficult to detect low-level laser irradiation. In addition, weakly biasing the pixels rather than allowing the pixels to remain unbiased increases the sensitivity of the pixel array to scene variations. The increased scene variation sensitivity, however, can also mask the laser heating that pixel array intends to detect.

One or more non-limiting embodiments of the invention address the above-described shortcomings of the prior art by providing a ROIC that includes a trigger sense circuit configured to compensate for laser heat detection masking caused by pulse-biasing pixel self-heating effects and scene variations. According to a non-limiting embodiment, the ROIC trigger sense circuit applies constant current to a bolometer pixel group and the resulting voltage change is monitored to detect the presence of laser heating. In one or more non-limiting embodiments, the ROIC trigger sense circuit includes a comparator circuit that utilizes a differential comparator reference from one or more column regions of the bolometer pixel group to compensate for laser heat detection masking caused by pulse-biasing pixel self-heating effects. In addition, the ROIC trigger sense circuit can be periodically calibrated (e.g., once per frame) to cancel mismatch and/or slow scene variations to further overcome laser heat detection masking.

With reference now to FIG. 1, a bolometer pixel 100 is illustrated according to a non-limiting embodiment. The bolometer pixel 100 includes a substrate 101 that supports a bolometer 102 via a pair of opposing support beams 104a and 104b. The support beams 104a, 104b each include an electrode 105a and 105b. The bolometer 102 includes a photosensitive region 106 (sometimes referred to as a mesa), which is interposed between the electrodes 105a, 105b, and thermally isolated from the substrate 101 by the support beams 104a, 104b.

The photosensitive resistive region 106 is formed from a thermoelectric conversion material (e.g. amorphous silicon) having a thermal resistance coefficient value. In some embodiments, an absorber layer 107 is formed on an upper surface of the photosensitive resistive region 106 and is configured to selectively pass wavelengths of light (e.g., infrared light). The thermal resistance coefficient value provides a bolometer thermal resistance 109, which can be utilized to sense thermal energy delivered to the bolometer pixel 100. For example, when thermal energy (e.g., infrared light) is delivered to the photosensitive resistive region 106, the resistance of the thermoelectric conversion material decreases. When the ROIC 140 applies a current, the change in bolometer electrical resistance is converted into a voltage, which can be read out via a ROIC 140 such that the bolometer 102 can be utilized as a thermal sensor.

Figure 2:
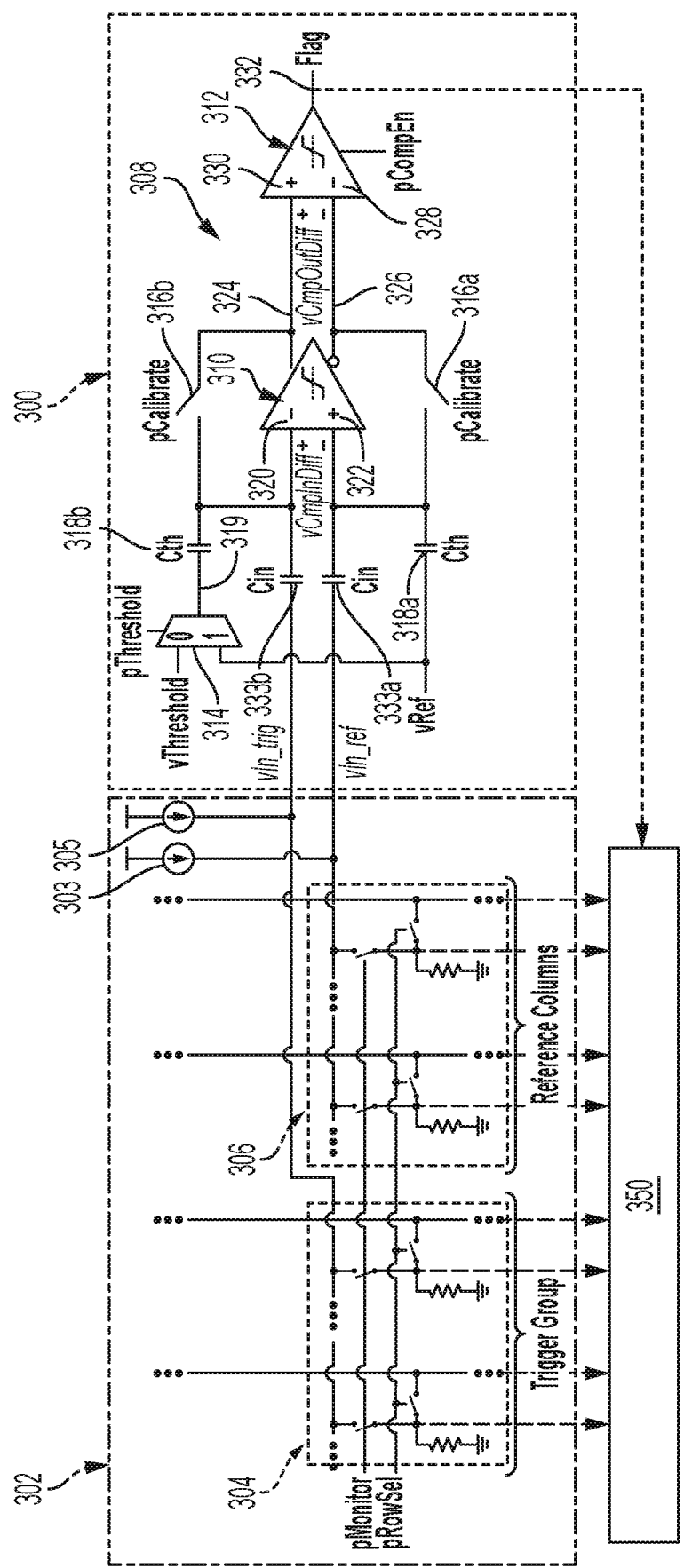
FIG. 2 is a schematic diagram of a trigger sense circuit included with a ROIC according to a non-limiting embodiment.

Turning to FIG. 2, a trigger sense circuit 300 included with a ROIC is illustrated according to a non-limiting embodiment. In one or more non-limiting embodiments, the trigger sense circuit 300 and ROIC can be implemented in an infrared or thermal imaging system. The trigger sense circuit 300 is capable of providing an instantaneous value indicative of one or more heated pixels. When this value crosses a threshold, a comparator circuit in the trigger sense circuit is tripped and outputs a trigger signal to an image controller which determines that one or more bolometer pixels are overheated. In response to detecting one or more overheated pixels, the controller can output a protection control signal that invokes a thermal protection operation and/or initiates a thermal mitigation device such as, for example, a shutter or voltage-controlled window, that blocks the thermal energy source from delivered damaging radiation to the affected pixels.

The trigger sense circuit 300 is illustrated being in signal communication with a pixel array 302 that includes one or more pixel groups 306 and 304. Although two pixel groups are shown, it should be appreciated that the pixel array 302 can include additional pixel groups. According to a non-limiting embodiment, a first pixel group 304 can be utilized as a trigger group while a second pixel group 306 can be utilized as reference group 306. Accordingly, the trigger sense circuit 300 can perform time-varying comparisons by referencing different column regions of the pixel array 302 to detect damaging irradiation directed at the pixel array 302.

Each of the reference pixel group 306 and trigger pixel group 304 include selector switches in signal communication with a controller 350. The controller 350 can control the selector switches to selectively establish and disconnect signal communication between the reference and trigger pixel groups 306-304 and the trigger sense circuit 300. The selector switches are also configured to selectively connect and disconnect the reference pixel group 306 and trigger pixel group 304 to the controller 350. The controller 350 can also control the selector switches to select particular rows and/or columns included in the pixel array 300 to change the given pixels that are included in the reference pixel group 306 and trigger pixel group 304.

The trigger sense circuit 300 includes a pseudo-differential comparator circuit 308 in signal communication with the pixel array 302. The pseudo-differential comparator circuit 308 includes a pre-amplifier 310, an output comparator 312, a multiplexer (MUX) 314, one or more calibration switches 316a and 316b, and one or more coupling capacitors 318a and 318b.

The pre-amplifier 310 can be constructed as a dual-output differential amplifier 310, for example, which includes a negative input 320, a positive input 322, and rail-to-rail complementary outputs 324 and 326. The negative input 320 is in signal communication with pixel group 304 (e.g., the trigger pixel group) via coupling capacitor 333b and is in signal communication with the MUX 314 via coupling capacitor 318b. The positive input 322 is in signal communication with pixel group 306 (e.g., the reference pixel group) via coupling capacitor 333a and is in signal communication with a reference voltage (Vref) via coupling capacitor 318a. A first rail output 324 (e.g., non-inverting output) is connected to a positive input 330 of the output comparator 312 while the second rail output 326 (e.g., inverting output) is connected to the negative input 328 of the output comparator 312.

The MUX 314 includes a reference voltage input configured to receive the reference voltage (Vref), a voltage threshold input configured to receive a threshold voltage (vThreshold). The MUX 314 also includes a pulse threshold input configured to receive a threshold pulse signal (pThreshold), which serves as an input selector. For example, when the threshold pulse signal (pThreshold) is high, the MUX 314 outputs the reference voltage (Vref). When, however, the threshold pulse signal (pThreshold) is low, the MUX 314 outputs the threshold voltage (vThreshold). In one or more non-limiting embodiments, the threshold pulse signal (pThreshold) can be controlled and output by a controller, e.g., controller 350.

With continued reference to FIG. 2, the positive output 324 of the pre-amplifier is connected to the negative input 320 of the pre-amplifier via calibration switch 316b. The negative output 326 of the pre-amplifier is connected to the positive input 322 of the pre-amplifier via calibration switch 316a. Calibration switches 316a and 316b are switched between an open state and a closed state in response to a calibration pulse signal (pCalibrate). Accordingly, the calibration switches 316a and 316b can be operated to invoke a calibration mode that can remove process mismatches and temperatures variations.

Figure 3:
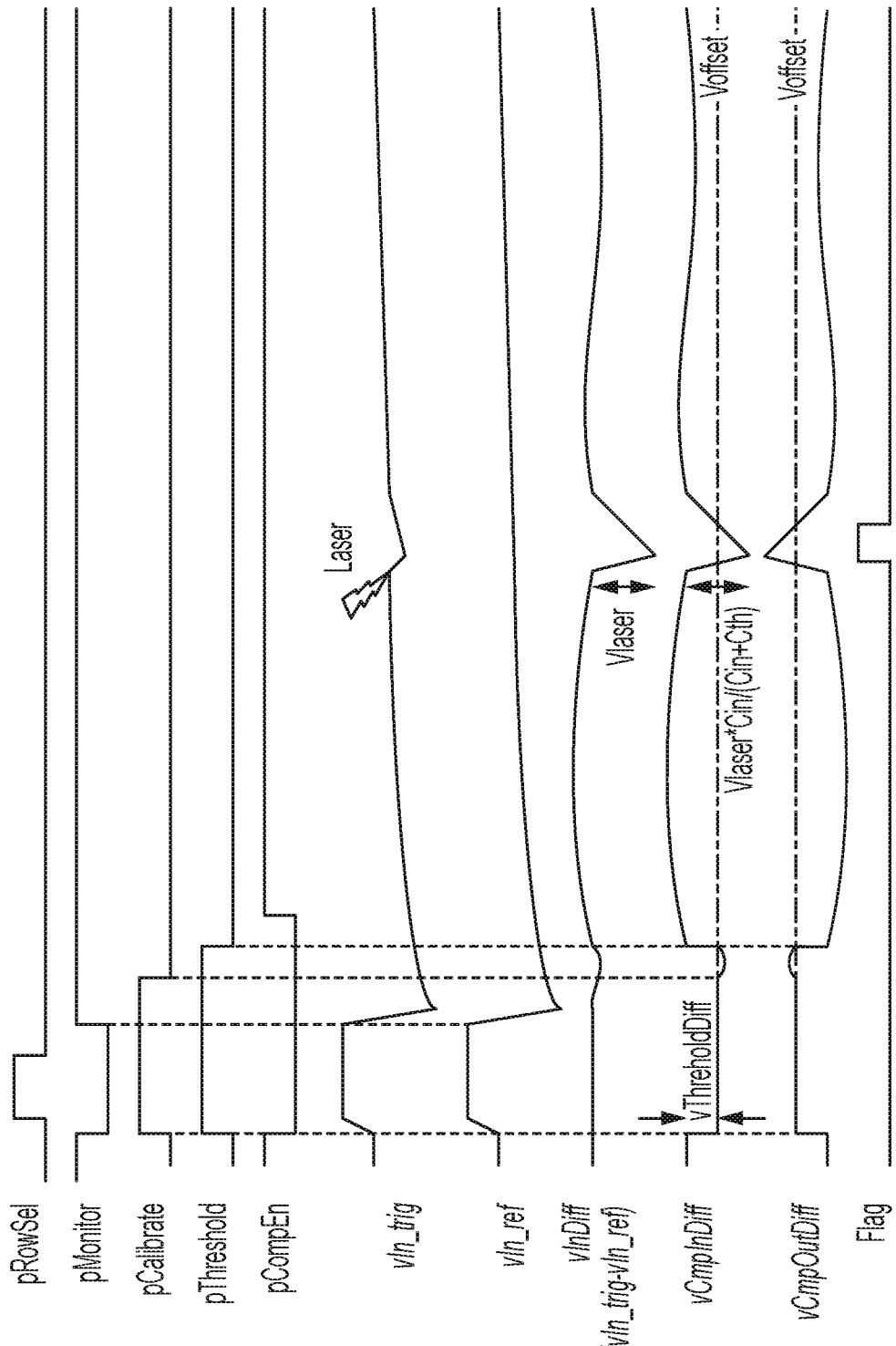
FIG. 3 are signal diagrams associated with the trigger sense circuit illustrated in FIG. 2.

FIG. 3 depicts signal diagrams illustrated with the trigger sense circuit 300. During operation, constant bias currents 303 and 305 are applied to pixel groups 306 and 304, respectively. The controller 350 utilizes a row select signal (pRowSel) a pixel monitor signal (pMonitor) to effectively select the pixels to be included in the pixel groups 304 and 306.

As described herein, pixel group 304 can be utilized as a trigger pixel group and provides a trigger voltage (vin_trig), while pixel group 306 can be utilized as a reference pixel group to a pixel reference voltage (vin_ref). When the trigger sense circuit 300 is invoked into the calibration mode, the calibration switches 316a and 316b are switched on (i.e., in a closed state), and the calibration pulse signal (pCalibrate) is set to a high state (e.g., a logic "1" state). During the calibration mode, the pre-amplifier 310 is configured to establish unity gain between the pre-amplifier inputs and pre-amplifier outputs, and the output comparator 312 receives a low-state comparator control signal (pCompEn) such that it is disabled. In one or more non-limiting embodiments, the low-state comparator control signal (pCompEn) can be generated by controller 350. Accordingly, the pre-amplifier 310 generates an offset voltage to remove false trigger events (e.g., cancel die mismatches, lot-to-lot variations, scene variations, and temperature variations). In addition, the preamplifier offset voltage and differential input voltage (vInDiff) is stored on Cin (333a and 333b) while the pre-amplifier offset voltage and reference voltage (vRef) are stored on the input threshold capacitors (Cth) (318b and 318a). In this example, vInDiff can be expressed as a difference between the trigger voltage (vin_trig) and the pixel reference voltage (vin_ref).

Scene information of the trigger pixel group 304 is also stored on the input capacitors (Cin) 333a and 333b when pMonitor is in a high state (e.g., a logic "1"). At this time, the output trigger signal 332 (i.e., "Flag") of the output comparator 312 is also low because it is disabled, i.e., the pCompEn signal is in a low state (e.g., a logic "0") during the calibration phase.

The trigger sense circuit 300 can be invoked into a comparison mode in response to switching off (i.e., opening) the calibration switches 316a and 316b, delivering a high-state comparator control signal (pCompEn) to the output comparator 312, and setting the threshold pulse signal (pThreshold) to a low state (e.g, a logic "0" state). Accordingly, the output of the MUX 314 changes from vRef to vThreshold. A fraction of this voltage change (vThresholdDiff) is applied to the input of the pre-amplifier 310, which imposes a trip point to optimize against or remove false trigger events. According to a non-limiting embodiment, the offset voltage and scene information stored on the input capacitors 333a and 333b will be canceled out in response to invoking the comparison mode (e.g., when the pCalibrate signal is low).

While the comparison mode is invoked, laser detection starts when the output comparator 312 is enabled in response to receiving the pCompEn signal in a high state (e.g., a logic "1"). When the pixel array 302 is operating normally (i.e., when the pixel array 302 is not receiving laser energy), vIn_trig slowly changes in response to scene change. During normal operation, the voltage changes caused by a scene change are typically smaller than vThresholdDiff and the output trigger signal 332 (i.e., "Flag") is low (e.g., a logic "0" value). When, however, laser energy impinges pixels included in the trigger group 304, vCmpInDiff decreases. When vCmpInDiff exceeds a threshold voltage (vThrholdDiff), the output trigger signal 332 (i.e., "Flag") becomes high (e.g., a logic "1" value).

The controller 350 receives the trigger signal 332 from the output comparator 312. In response to detecting the "high" signal state (e.g. a binary "1" bit value), the controller 350 can output a protection control signal that invokes a protection operation to protect an overheated bolometer pixel or pixel group. The protection operation can include, but is not limited to, initiating a fast-acting mechanical shutter or a variable transmission window mounted in front of the bolometer array to block the excessive energy delivered to the over-heated pixel(s).

Figure 4:
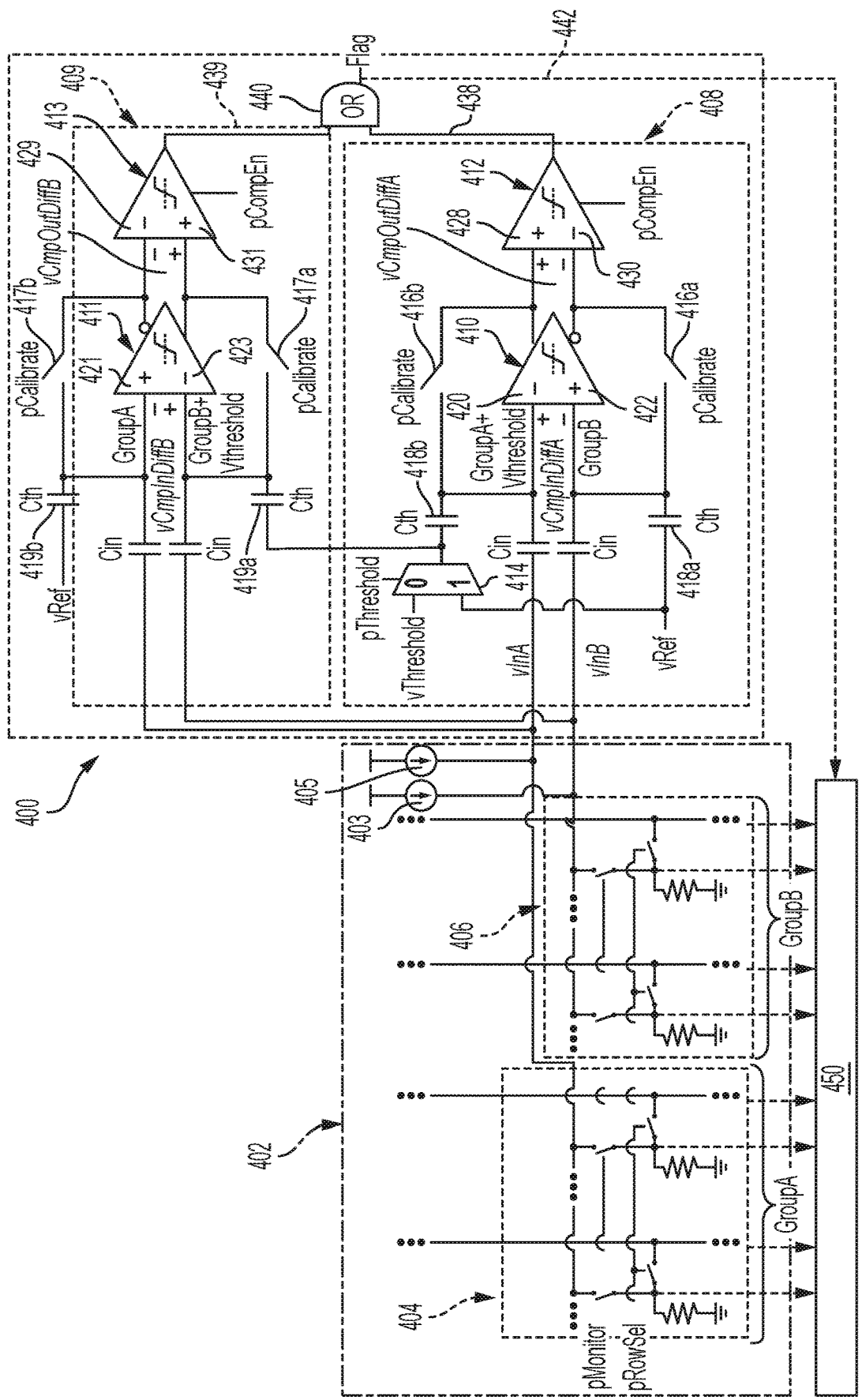
FIG. 4 is a schematic diagram of a trigger sense circuit included with a ROIC according to a non-limiting embodiment.

With reference to FIG. 4, a trigger sense circuit 400 is illustrated according to another non-limiting embodiment. The trigger sense circuit 400 is illustrated being in signal communication with a pixel array 402 that includes one or more pixel groups 404 and 406. Although two pixel groups are shown, it should be appreciated that the pixel array 402 can include additional pixel groups.

As described herein, the trigger sense circuit 400 can be utilized with an ROIC that is implemented in an infrared or thermal imaging system. The trigger sense circuit 400 includes dual-comparator circuits, which when tripped output can generate the output of a trigger signal to an image controller. Based on the trigger signal, the controller can detect one or more overheated pixels and output a protection control signal that invokes a thermal protection operation and/or initiates a thermal mitigation device such as, for example, a shutter or voltage-controlled window, that blocks the thermal energy source from delivered damaging radiation to the affected pixels.

The trigger sense circuit 400 includes a first differential comparator circuit 408 and a second differential comparator circuit 409. The connections and components of the first differential comparator circuit 408 and a second differential comparator circuit 409 are similar to that of the pseudo-differential comparator circuit 308 described above, and therefore full details of similar connections and components will be omitted for the sake of brevity. In this example, both the first and second differential comparator circuits 408 and 409 are sensitive to laser energy applied to a respective pixel group 404 and 406. In this manner, the first and second differential comparator circuits 408 and 409 operate together to provide a full-differential comparator capable of detecting damaging irradiation directed at the pixel array 402 as described in greater detail below.

Each of the pixel groups 404 and 406 include selector switches in signal communication with controller 450. As described herein, the controller 450 can control the selector switches to selectively establish and disconnect signal communication between the pixel groups 404 and 406 and the differential comparator circuits 408 and 409. The selector switches are also configured to selectively connect and disconnect the pixel groups 404 and 406 to the controller 450. The controller 450 can also control the selector switches to select particular rows and/or columns included in the pixel array 402 to change the given pixels that are included in the pixel groups 404 and 406.

The controller 450 is also configured to control and output a threshold pulse signal (pThreshold), which serves as an input selector for the MUX 414. Accordingly, the controller 450 can control the output of the MUX 414 to invoke the calibration mode or the comparison mode of the trigger sense circuit 400 as described herein.

As described above, the trigger sense circuit 400 includes first and second differential comparator circuits 408 and 409 that operate together to provide a full-differential comparator capable of detecting damaging irradiation directed at the pixel array 402. The first differential comparator circuit 408 includes a first pre-amplifier 410, while the second differential comparator circuit 409 includes a second pre-amplifier 411. The first differential comparator circuit 408 utilizes pixel group 404 to establish a first voltage threshold to perform a voltage comparison with respect to voltage (VinB) provided by pixel group 406, while the second differential comparator circuit 409 utilizes pixel group 406 as a second voltage threshold to perform a voltage comparison with respect to voltage (VinA) provided by pixel group 404. Accordingly, a full voltage differential analysis can be performed on different regions or different pixel groups of the pixel array 402.

Figure 5:
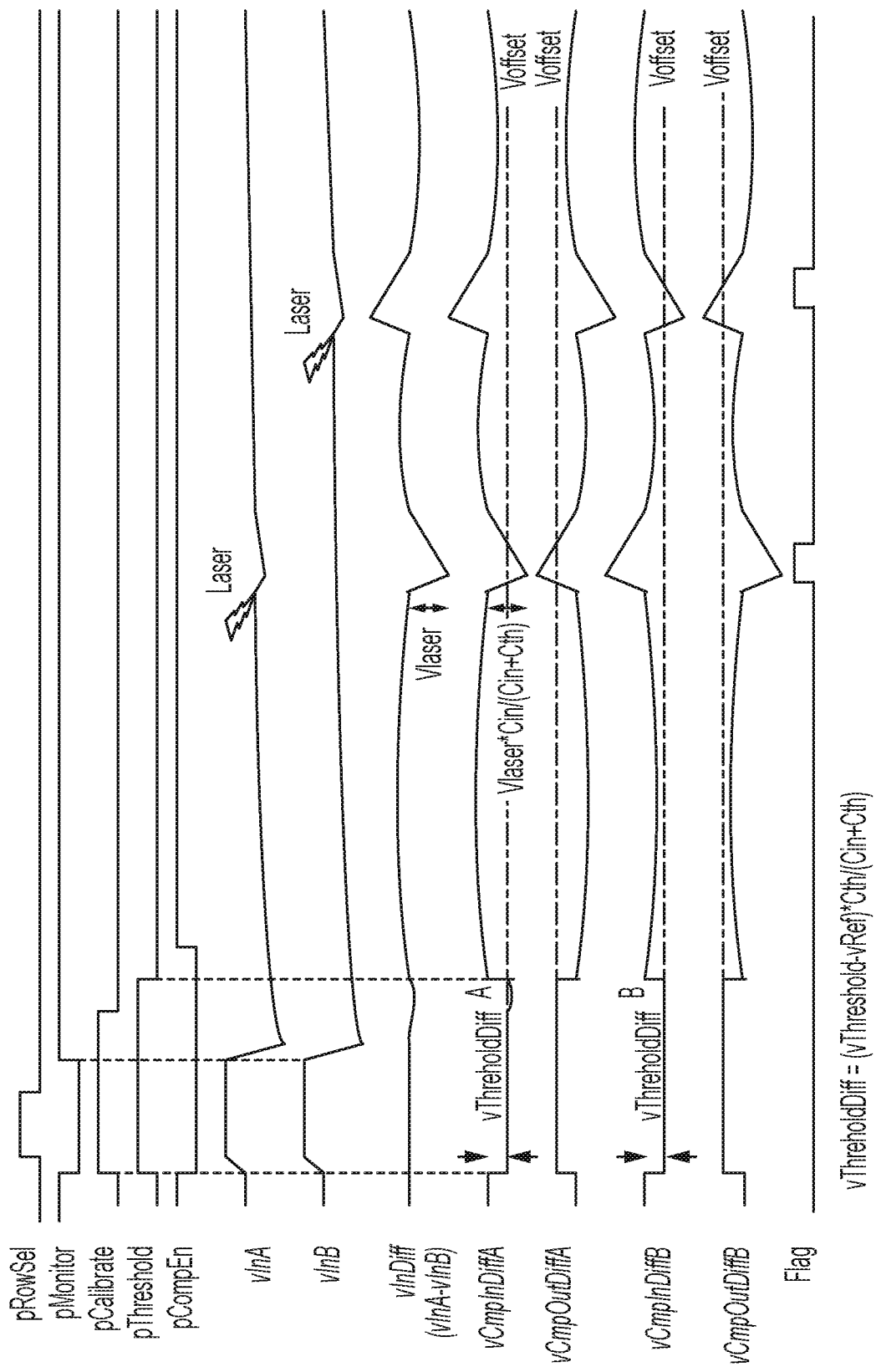
FIG. 5 are signal diagrams associated with the trigger sense circuit illustrated in FIG. 4.

FIG. 5 depicts signal diagrams illustrated with the trigger sense circuit 400 shown in FIG. 4. According to a non-limiting embodiment, the first differential comparator circuit 408 utilizes pixel group 404 to establish a first threshold voltage (GroupA+VthresholdA) for the first pre-amplifier 410 while the second differential comparator circuit 409 utilizes pixel group 406 to establish a second threshold voltage (GroupB+VthresholdB) for the second pre-amplifier 411. Accordingly, the first pre-amplifier 410 compares a first input voltage (GroupBv) provided by pixel group 406 to the first threshold voltage (GroupA+VthresholdA) to determine a first input comparator voltage differential (vCompInDiffA). Likewise, the second pre-amplifier 411 compares a second input voltage (GroupAv) provided by pixel group 404 to the second threshold voltage (GroupB+VthresholdB) to determine a second input comparator voltage differential (vCompInDiffB).

When the calibration switches 416a-416b and 417a-417b are switched on (i.e., in a closed state), trigger sense circuit 400 is invoked into a calibration phase. During the calibration phase, the first pre-amplifier 410 and second pre-amplifier 411 are configured to establish a unity gain, respectively, while the first and second output comparators 412 and 413 are disabled. Accordingly, the first pre-amplifier 410 utilizes voltage changes (vInA–VInB) of the first and second pixel groups 404 and 406 to provide a first pre-amplifier offset voltage and a first comparator differential input voltage is stored on the first capacitor pair (Cin) 433a and 433b, while pre-amplifier offset voltage and reference voltage (vRef) is stored on the first threshold capacitor pair (Cth) 418a and 418b. Likewise, the second pre-amplifier 411 utilizes the voltage changes (vInA–VInB) of the first and second pixel groups 404 and 406 to provide a second pre-amplifier offset voltage and a second comparator differential input voltage is stored on the second capacitor pair (Cin) 435a and 435b, while pre-amplifier offset voltage and reference voltage (vRef) is stored on the second threshold capacitor pair (Cth) 419a and 419b.

When the pMonitor signal switches high, scene information of pixel group 404 is stored on input capacitors 433a and 433b of the first differential comparator circuit 408, while scene information of pixel group 406 is stored on input capacitors 435a and 435b of the second differential comparator circuit 409. At this time, the output signals 438 and 439 of the first and second output comparators 412 and 413, respectively, are low because they are disabled, i.e., because pCompEn signal is in a low state (e.g., a logic "0" value) during the calibration phase.

In response to switching off (i.e., in an open state) the calibration switches 416a-416b and 417a-417b, pThreshold transitions to a low state causing the output of the MUX 414 to change from vRef to vThreshold. A fraction of this voltage change (vThresholdDiff) is applied to the input of the first and second pre-amplifiers 410 and 411, which imposes a trip point to optimize against false trigger.

Laser detection starts when output comparators 412 and 413 are enabled in response to the pCompEn signal transitioning to a high state. During normal operation (i.e., when neither pixel group 404 nor pixel group 406 are receiving laser energy), both the first input voltage vInA and the second input voltage vInB slowly change during a scene change. The voltage changes caused by a scene change during normal operation are typically smaller than vThresholdDiff such that the output signals 438 and 439 provided by the first and second output comparators 412 and 413 are low (e.g., a logic "0" value).

When, however, laser energy impinges pixels in pixel group 404 vCmpInDiffA decreases. Likewise, vCmpInDiffB decreases when laser energy impinges pixels in pixel group 406. When vCmpInDiffA exceeds a first threshold voltage (vThrholdDiffA), the output signal 438 of the first output comparator 412 transitions to a high state (e.g., a logic "1" value). Similarly, the output signal 439 of the second output comparator 413 transitions to a high state (e.g., a logic "1" value) when vCmpInDiffB exceeds a second threshold voltage (vThrholdDiffB).

The output signal 438 of the first output comparator 412 and the output signal 439 of the second output comparator 413 are each delivered to an OR Gate 440. When output signal 438 and output signal 439 both have a low state (e.g., a logic "0" value), the output trigger signal 442 (i.e., "Flag") output from the OR Gate 440 is in a low state (e.g. is a logic "0" value). When, however, output signal 438 and/or output signal have a high state (e.g., a logic "1" value), the output trigger signal 442 (i.e., "Flag") generated by the OR Gate 440 is in a high state (e.g. is a logic "1" value). Although an "OR Gate" is illustrated, it should be appreciated that other logic gates or combination of logic gates can be utilized to establishing similar behavioral logic described herein without departing from the scope of the invention.

The controller 450 receives the trigger signal 442 from the OR Gate 442. In response to detecting the "high" signal state (e.g. a binary "1" bit value), the controller 450 can output a protection control signal that invokes a protection operation to protect an overheated bolometer pixel or pixel group. The protection operation can include, but is not limited to, initiating a fast-acting mechanical shutter or a variable transmission window mounted in front of the bolometer array to block the excessive energy delivered to the overheated pixel(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A trigger sense circuit comprising:
   a pseudo-differential comparator circuit in signal communication with a pixel array, the pseudo-differential comparator circuit comprising:
   a first input in signal communication with a reference pixel group included in the pixel array to receive a pixel reference voltage; and
   a second input in signal communication with a target pixel group included in the pixel array to receive a pixel target voltage,
   wherein the pseudo-differential comparator circuit selectively operates in a calibration mode to remove false trigger events, and a comparison mode to detect at least one overheated pixel included in the target pixel group.

2. The trigger sense circuit of claim 1, wherein the false trigger events include heating caused by one or a combination of die mismatches, lot-to-lot variations, scene variations, and temperature variations.

3. The trigger sense circuit of claim 1, wherein in response to invoking the comparison mode the pseudo-differential comparator circuit compares the pixel target voltage to the pixel reference voltage and outputs a trigger signal in response to the pixel target voltage exceeding the pixel reference voltage.

4. The trigger sense circuit of claim 3, wherein the pseudo-differential comparator circuit further comprises:
   a multiplexer configured to selectively output one of a reference voltage or a threshold voltage;
   a pre-amplifier in signal communication with the first input to receive the reference voltage, the second input to receive the target voltage, and the multiplexer to receive the reference voltage or the threshold voltage, the pre-amplifier configured to output a differential voltage indicating a difference between the pixel target voltage and the pixel reference voltage; and
   an output comparator in signal communication with the pre-amplifier to receive the differential voltage, and to output a trigger signal indicating detection of the at least one overheated pixel included in the target pixel group based on the differential voltage.

5. The trigger sense circuit of claim 4, wherein in response to invoking the calibration mode, the pre-amplifier is configured to establish a unity gain and the output comparator is disabled such that the trigger signal has a logic "0" value.

6. The trigger sense circuit of claim 5, wherein in response to invoking the comparison mode, the output comparator is enabled and compares the differential voltage to a differential voltage threshold.

7. The trigger sense circuit of claim 6, wherein the output comparator outputs the trigger signal indicating detection of the at least one overheated pixel included in the target pixel group in response to the differential voltage exceeding the differential voltage threshold.

8. The trigger sense circuit of claim 1, wherein a constant current is applied to the reference pixel group and the target pixel group, and a voltage change of the target pixel group with respect to the reference pixel group is monitored to detect damaging irradiation.

9. The trigger sense circuit of claim 8, wherein the pseudo-differential comparator circuit selectively utilizes different column regions in the reference pixel group and selectively utilizes different column regions in the target pixel group to compensate for self-heating effects produced by bolometer pulsed biasing.

10. A trigger sense circuit comprising:
    a full-differential comparator circuit in signal communication with a pixel array, the full-differential comparator circuit comprising:
    a first differential comparator configured to compare a first pixel voltage associated with a first pixel group included in the pixel array with a first pixel voltage threshold defined by a second pixel group included in the pixel array; and
    a second differential comparator configured to compare a second pixel voltage associated with the second pixel group with a second pixel voltage threshold defined by the first pixel group,
    wherein the full-differential comparator circuit selectively operates in a calibration mode to remove false trigger events, and a comparison mode to detect at least one overheated pixel included in one or both of the first pixel group and the second pixel group.

11. The trigger sense circuit of claim 10, wherein the false trigger events include heating caused by one or a combination of die mismatches, lot-to-lot variations, scene variations, and temperature variations.

12. The trigger sense circuit of claim 10, wherein in response to invoking the comparison mode the first differential comparator performs a first comparison between the first pixel voltage associated with a first pixel group included in the pixel array and the first pixel voltage threshold defined by a second pixel group included in the pixel array, and the second differential comparator performs a second comparison between the second pixel voltage associated with the second pixel group and the second pixel voltage threshold defined by the first pixel group, and the full-differential comparator detects the at least one overheated pixel based on the first comparison and the second comparison.

13. The trigger sense circuit of claim 10, wherein:
    the first differential comparator comprises:
    a first input in signal communication with the first pixel group to receive a first input voltage; and
    a second input in signal communication with the second pixel group to receive a second input voltage, wherein the first input voltage establishes the first pixel threshold voltage and the second input voltage establishes the first pixel voltage; and the second differential comparator comprises:
a first input in signal communication with the first pixel group to receive the first input voltage; and
a second input in signal communication with the second pixel group to receive the second input voltage,
wherein the first input voltage establishes the second pixel voltage and the second input voltage establishes the second pixel threshold voltage.

14. The trigger sense circuit of claim 13, wherein the full-differential comparator circuit further comprises:
a multiplexer configured to selectively output one of a reference voltage or a threshold voltage; and
a logic gate in signal communication with the first differential comparator to receive a first output signal indicating a first result of the first comparison and in signal communication with the second differential comparator to receive a second output signal indicating a second result of the second comparison,
wherein the logic gate is configured to output a trigger signal indicating detection of the at least one overheated pixel included in the target pixel group based on the first output signal and the second output signal.

15. The trigger sense circuit of claim 14, wherein:
the first differential comparator comprises:
a first pre-amplifier including a first negative input in signal communication with the first input to receive the first pixel threshold voltage established by the first input voltage and a first positive input in signal communication with the second input to receive the first pixel threshold voltage established by the second input voltage, and in signal communication with the multiplexer to receive the reference voltage or the threshold voltage, the first pre-amplifier configured to output a first differential voltage indicating a difference between the first pixel voltage and the first pixel threshold voltage; and
a first output comparator in signal communication with the first pre-amplifier to receive the first differential voltage, and to deliver the first output signal to the logic gate indicating detection of the at least one overheated pixel included in the second pixel group based on the first differential voltage; and the second differential comparator comprises:
a second pre-amplifier including a second negative input in signal communication with the second input to receive the second pixel threshold voltage established by the second input voltage and including a second positive input in signal communication with the first input to receive the second pixel voltage established by the first input voltage, the second pre-amplifier in signal communication with the multiplexer to receive the reference voltage or the threshold voltage, the second pre-amplifier configured to output a second differential voltage indicating a difference between the second pixel voltage and the second pixel threshold voltage; and
a second output comparator in signal communication with the second pre-amplifier to receive the second differential voltage, and to deliver the second output signal to the logic gate indicating detection of the at least one overheated pixel included in the first pixel group based on the second differential voltage.

16. The trigger sense circuit of claim 15, wherein in response to invoking the calibration mode, the first and second pre-amplifiers are configured to establish a unity gain, respectively, and the first and second output comparators are disabled.

17. The trigger sense circuit of claim 16, wherein in response to invoking the comparison mode, the first and second output comparators are enabled such that the first output comparator compares the first differential voltage to a first differential voltage threshold and the first output comparator compares the second differential voltage to a second differential voltage threshold.

18. The trigger sense circuit of claim 16, wherein the first output comparator outputs the first output signal indicating detection of the at least one overheated pixel included in the second pixel group in response to the first differential voltage exceeding the first differential voltage threshold, and the second output comparator outputs the second output signal indicating detection of the at least one overheated pixel included in the first pixel group in response to the second differential voltage exceeding the second differential voltage threshold.

19. The trigger sense circuit of claim 10, wherein a constant current is applied to the first pixel group and the second pixel group, and voltage changes of the first pixel group and the second pixel group are monitored to detect damaging irradiation.

20. The trigger sense circuit of claim 11, wherein the full-differential comparator circuit utilizes different column regions of the first and second pixel groups to compensate for self-heating effects produced by bolometer pulsed biasing.

* * * * *